US012430173B2

(12) United States Patent
Wang et al.

(10) Patent No.: US 12,430,173 B2
(45) Date of Patent: Sep. 30, 2025

(54) APPROACH TO GRACEFULLY RESOLVE RETRY STORMS

(71) Applicant: International Business Machines Corporation, Armonk, NY (US)

(72) Inventors: Yue Wang, Beijing (CN); Wei Wu, Beijing (CN); Xin Peng Liu, Beijing (CN); Liang Wang, Beijing (CN); Biao Chai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 17/949,995

(22) Filed: Sep. 21, 2022

(65) Prior Publication Data
US 2024/0095072 A1    Mar. 21, 2024

(51) Int. Cl.
*G06F 9/50* (2006.01)
*G06F 11/07* (2006.01)

(52) U.S. Cl.
CPC .......... *G06F 9/5005* (2013.01); *G06F 9/5077* (2013.01); *G06F 11/0793* (2013.01); *G06F 2209/505* (2013.01)

(58) Field of Classification Search
CPC .. G06F 9/5005; G06F 9/5077; G06F 11/0793; G06F 2209/505; G06F 11/1438; G06F 11/1482; G06F 2209/481; G06F 2209/482; G06F 2209/483; G06F 2209/5013; G06F 2209/549; G06F 9/5072; G06F 9/547
See application file for complete search history.

(56) References Cited

U.S. PATENT DOCUMENTS

| 11,388,273 | B2 * | 7/2022 | Bomma | H04L 67/306 |
| 11,418,603 | B2 | 8/2022 | Ross et al. | |
| 11,429,435 | B1 * | 8/2022 | Watson | G06F 9/5038 |
| 11,563,636 | B1 * | 1/2023 | Kairali | H04L 67/562 |

(Continued)

FOREIGN PATENT DOCUMENTS

| CN | 112965823 A | 6/2021 |
| WO | 2024/062313 A1 | 3/2024 |

OTHER PUBLICATIONS

Piotr, "Circuit breaker and retries on Kubernetes with Istio and Spring Boot," Piotr's TechBlog, Jun. 3, 2020, pp. 1-11.

(Continued)

*Primary Examiner* — S. Sough
*Assistant Examiner* — Selena Sabah Nahra
(74) *Attorney, Agent, or Firm* — James L. Olsen

(57) ABSTRACT

A method includes, in response to receiving an incoming service request and establishing a call chain of pods of a service mesh network, setting a retry locker parameter to a locked state for each pod in the call chain. A locked retry locker parameter prevents the pod from initiating retries of a service request. The method includes, in response to determining that a pod in the call chain is unavailable, setting the retry locker parameter to an unlocked state for a previous pod just prior to the pod that is unavailable. The unlocked state allows a retry to the pod that is unavailable. In response to the previous pod reaching a retry limit, the method includes setting the retry locker parameter to unlocked for each pod in the call chain and sending a service termination message to a service requester.

20 Claims, 13 Drawing Sheets

(56) References Cited

U.S. PATENT DOCUMENTS

2013/0219403 A1    8/2013   Kasten et al.
2020/0045117 A1    2/2020   Ross et al.

OTHER PUBLICATIONS

Modi, "How to Avoid Retry Storms in Distributed Systems," FAUN Publication, Jul. 3, 2021, pp. 1-4.
Istio, "Architecture," Istio Authors, known about and downloaded on Aug. 11, 2022, pp. 1-3.
Anonymous, "Method to provide resilience to failures due to rate limiting in long running processes by automatically pausing and resuming in an adaptive way," IP.Com, Oct. 8, 2020, pp. 1-4.
Johndowns et al., "Retry Storm antipattern," Microsoft, Apr. 7, 2022, pp. 1-7.
Saleh Sedghpour et al: "An Empirical Study of Service Mesh Traffic Management Policies for Microservices", Proceedings of the 27th ACM Symposium on Virtual Reality Software and Technology, ACM, New York, NY, USA, Apr. 9, 2022, pp. 17-27.
PCT/IB2023/058761, "International Search Report and the Written Opinion of the International Searching Authority, or the Declaration", International Searching Authority, Oct. 20, 2023, pp. 1-14.
ByteDance Technical Team, "How to Retry Gracefully" InfoQ, Jan. 11, 2021, 12 pages.
Cuervo, F., Handling Overload, Retrieved from: https://web.archive.org/web/20201210225815/https://sre.google/sre-book/handling-overload/, Dec. 10, 2020, 15 pages.
Retry Storm Antipattern, Retrieved from: https://learn.microsoft.com/zh-cn/azure/architecture/antipatterns/retry-storm/, Apr. 21, 2025, 5 pages.
Transient fault handling, Retrieved from: https://learn.microsoft.com/en-us/azure/architecture/best-practices/transient-faults, Feb. 24, 2023, 10 pages.

* cited by examiner

APPROACH TO GRACEFULLY RESOLVE RETRY STORMS

BACKGROUND

The subject matter disclosed herein relates to call chains of a service mesh and more particularly relates to preventing a retry storm for a call chain of a service mesh.

Microservices are an architectural and organizational approach to software development where software provides small independent services that communicate over an application programming interface ("API"). Microservices often make applications easier to scale and faster to develop, which enables quicker deployment of new microservices. Typically, microservices run in a cloud computing environment and are deployed in a service mesh network running on one or more compute nodes in the cloud computing environment. In a service mesh network, typically a microservice, or simply "service," runs in a pod. A pod includes one or more containers and a pod includes an application and a mesh network component that serves to enable communication between the application and other components, pods, users, etc. The mesh network component provides a mechanism to connect pods within the service mesh network.

Very often a service requests one or more other services. The called services may then call other services. When services call other services, typically a service mesh network will create a call chain that includes the pods of the services connected in a linear sequence. For example, a call chain may include: service A calls service B, which calls service C, which calls service D.

A problem arises, however, when a service deep in a call chain experiences an outage. Often each pod providing a service in a call chain includes a mechanism for retries. A retry for a service typically resends a service request after a timeout period. For example, service D may be unavailable. After an initial service request from service C, the pod providing service C will keep resending the service request to service D after a prescribed time delay up to a retry limit. After reaching a retry limit, service C will then reply to service B indicating a failed service request or similar message. Service B typically also has a retry limit and will resend a service request to service C. Likewise, service A typically also has a retry limit and will resend service requests to service B. If each service in a call chain has a retry limit of 3, when service D is unavailable service A will retry 3 times, service B will retry 9 times, and service C will retry 27 times. This excessive number of retries is called a retry storm, which negatively impacts the service mesh network causing delays and excess processing cycles.

SUMMARY

A computer-implemented method for gracefully resolving retry storms is disclosed. According to embodiments of the present invention, the computer-implemented method includes, in response to receiving an incoming service request and establishing a call chain of pods of a service mesh network, setting a retry locker parameter to a locked state for at least each pod in the call chain except for a last pod in the call chain. The incoming service request requires a subsequent service request and a response from three or more pods in the call chain and the call chain includes the three or more pods in a linear sequence. The retry locker parameter of a pod of the call chain in the locked state prevents the pod from initiating retries of a service request to a subsequent pod of the call chain. The computer-implemented method includes, in response to determining that a status of a pod in the call chain is unavailable for responding to a service request from a previous pod in the call chain, setting the retry locker parameter to an unlocked state for the previous pod. The unlocked state allows a retry of a service request to the pod that is unavailable. The computer-implemented method includes, in response to the previous pod reaching a retry limit, setting the retry locker parameter to unlocked for each pod in the call chain and sending a service termination message to a service requester that sent the incoming service request. Beneficially, the computer-implemented method provides a convenient way to prevent retry storms, which decreases delays and execution time. An apparatus and computer program product also perform the functions of the computer-implemented method.

In some embodiments, the computer-implemented method includes, in response to the previous pod receiving a response to a service request prior to reaching the retry limit, setting the retry locker parameter to unlocked for each pod in the call chain and responding to the incoming service request received at a first pod in the call chain. Setting the retry locker parameter to unlocked after resumption of a service that was unavailable provides a mechanism to reset the retry locker parameter.

In some embodiments, each pod includes an application configured to provide a response to a service request and a mesh network component facilitating communication between the application and other pods of the service mesh network. In other embodiments, a retry controller communicates with each mesh network component and a retry locker parameter status, a retry status, and a retry timeout status for each pod of the call chain are stored in a common metadata store. The retry controller sets the retry locker parameter for each pod of the call chain. Using a central retry controller provides a convenient service mesh level control. In other embodiments, each pod of the call chain includes a retry locker and the mesh network component of each pod of the call chain communicate with each other and a retry locker of a pod sets the retry locker parameter for the pod in response to communications from at least one or more adjacent pods in the call chain. This distributed control in the retry lockers, in some instances, reduces complexity by allowing a same block of code to be included in each retry locker.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
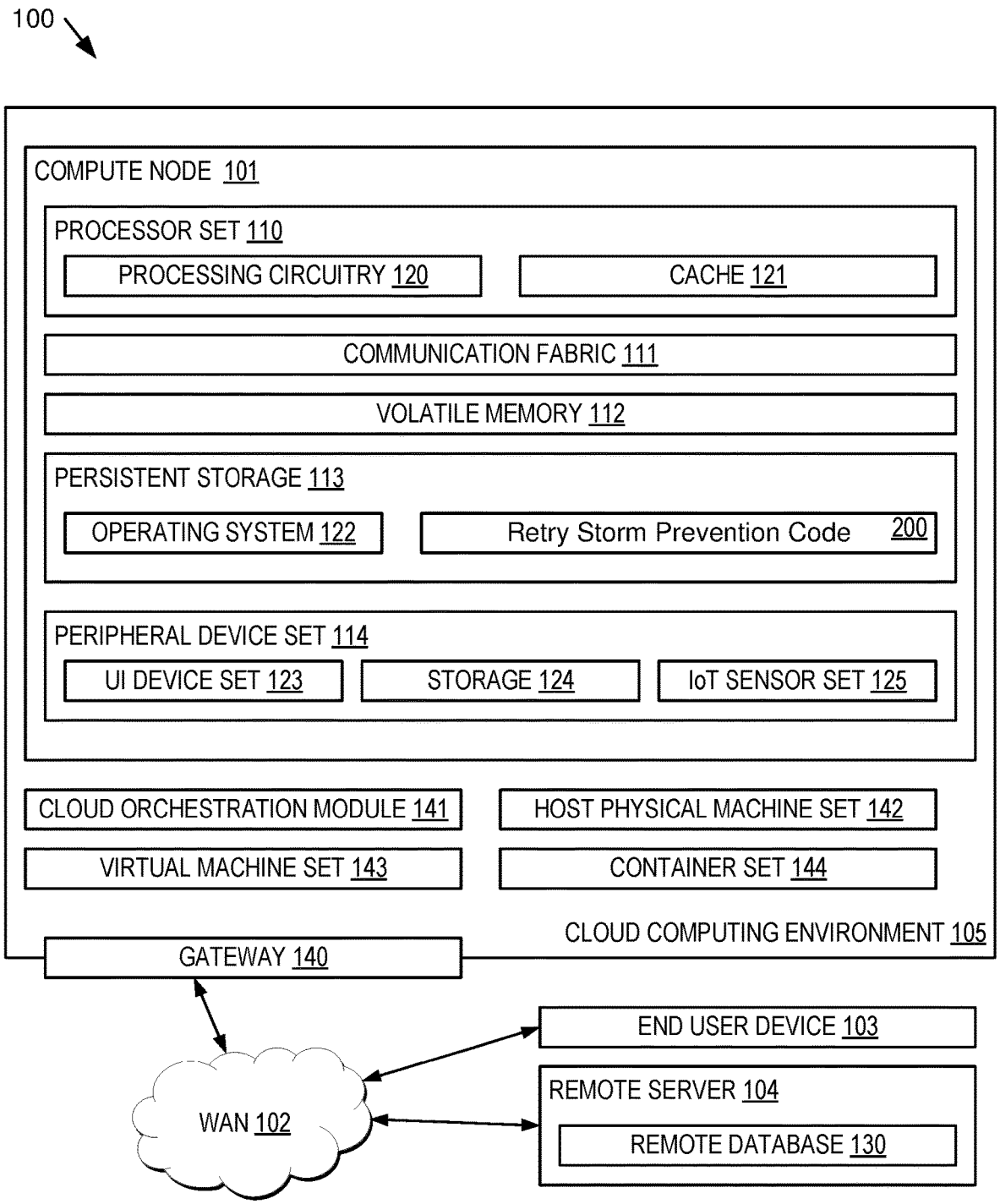
FIG. 1 is a schematic block diagram illustrating a computing environment for gracefully resolving retry storms, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Various aspects of the present disclosure are described by narrative text, flowcharts, block diagrams of computer systems and/or block diagrams of the machine logic included in computer program product ("CPP") embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory ("RAM"), read-only memory ("ROM"), erasable programmable read-only memory ("EPROM or Flash memory"), static random access memory ("SRAM"), compact disc read-only memory ("CD-ROM"), digital versatile disk ("DVD"), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

A computer-implemented method for gracefully resolving retry storms is disclosed. According to embodiments of the present invention, the computer-implemented method includes, in response to receiving an incoming service request and establishing a call chain of pods of a service mesh network, setting a retry locker parameter to a locked state for at least each pod in the call chain except for a last pod in the call chain. The incoming service request requires a subsequent service request and a response from three or more pods in the call chain and the call chain includes the three or more pods in a linear sequence. The retry locker parameter of a pod of the call chain in the locked state prevents the pod from initiating retries of a service request to a subsequent pod of the call chain. The computer-implemented method includes, in response to determining that a status of a pod in the call chain is unavailable for responding to a service request from a previous pod in the call chain, setting the retry locker parameter to an unlocked state for the previous pod. The unlocked state allows a retry of a service request to the pod that is unavailable. The computer-implemented method includes, in response to the previous pod reaching a retry limit, setting the retry locker parameter to unlocked for each pod in the call chain and sending a service termination message to a service requester that sent the incoming service request.

In some embodiments, the computer-implemented method includes, in response to the previous pod receiving a response to a service request prior to reaching the retry limit, setting the retry locker parameter to unlocked for each pod in the call chain and responding to the service request received at a first pod in the call chain. In other embodiments, in response to the previous pod receiving a response, pods in the call chain each respond in turn to a received service request.

In some embodiments, each pod includes an application configured to provide a response to a service request and a mesh network component facilitating communication between the application and other pods of the service mesh network. In other embodiments, determining that the status of the pod in the call chain is unavailable includes receiving a status from a mesh network component of the pod that is unavailable indicating that the pod is unavailable, and/or determining, by a mesh network component in the previous pod, that the pod that is unavailable has not sent a response prior to a service request timeout.

In other embodiments, the computer-implemented method includes determining a status of the retry locker parameter, a retry counter, and a timeout counter of each pod of the call chain prior to setting the retry locker parameter for each pod of the call chain. The status of the retry locker parameter, the retry counter, and the timeout counter of each pod of the call chain are stored in a metadata store. In other embodiments, a retry controller communicates with each mesh network component and a retry locker parameter status, a retry status, and a retry timeout status for each pod of the call chain are stored in a common metadata store. The retry controller sets the retry locker parameter for each pod of the call chain. In other embodiments, each pod of the call chain includes a retry locker and the mesh network component of each pod of the call chain communicate with each other and a retry locker of a pod sets the retry locker parameter for the pod in response to communications from at least one or more adjacent pods in the call chain.

An apparatus for gracefully resolving retry storms includes a lock module configured to, in response to receiving an incoming service request and establishing a call chain of pods of a service mesh network, set a retry locker parameter to a locked state for at least each pod in the call chain except for a last pod in the call chain. The incoming service request requires a subsequent service request and a response from three or more pods in the call chain and the call chain includes the three or more pods in a linear sequence. The retry locker parameter of a pod of the call chain in the locked state prevents the pod from initiating retries of a service request to a subsequent pod of the call chain. The apparatus includes a single unlock module configured to, in response to determining that a status of a pod in the call chain is unavailable for responding to a service request from a previous pod in the call chain, set the retry locker parameter to an unlocked state for the previous pod. The unlocked state allows a retry of a service request to the pod that is unavailable. The apparatus includes an unlock module configured to, in response to the previous pod reaching a retry limit, set the retry locker parameter to unlocked for each pod in the call chain and send a service termination message to a service requester that sent the incoming service request.

In some embodiments, the apparatus includes a resume module configured to, in response to the previous pod receiving a response to a service request prior to reaching the retry limit, set the retry locker parameter to unlocked for each pod in the call chain and responding to the service request received at a first pod in the call chain. In other embodiments, in response to a mesh network element of the previous pod receiving a response, pods in the call chain each respond in turn to a received service request.

In some embodiments, each pod includes an application configured to provide a response to a service request and a mesh network component of the pod facilitates communication between the application and other mesh network components of pods of the service mesh network. In other embodiments, determining that that the status of the pod in the call chain is unavailable includes receiving a status from the mesh network component of the pod that is unavailable indicating that the pod is unavailable, and/or determining, by the mesh network component in the previous pod, that the pod that is unavailable has not sent a response prior to a service request timeout.

In other embodiments, the apparatus includes a status module configured to determine a status of the retry locker parameter, a retry counter, and a timeout counter of each pod of the call chain prior to setting the retry locker parameter for each pod of the call chain. The status of the retry locker parameter, the retry counter, and the timeout counter of each pod of the call chain are stored in a metadata store. In other embodiments, the apparatus includes a retry controller in communication with a retry locker in each of the pods of the call chain and the lock module, the single unlock module and the unlock module are controlled by the retry controller and the retry locker of each pod of the call chain. In other embodiments, the apparatus includes a retry locker in each pod of the call chain and the mesh network component of each pod of the call chain communicate with each other and the lock module, the single unlock module and the unlock module are controlled by the retry locker of each pod of the call chain.

A computer program product includes a non-transitory computer readable storage medium storing code, the code being configured to be executable by a processor to perform operations that include, in response to receiving an incoming service request and establishing a call chain of pods of a service mesh network, setting a retry locker parameter to a locked state for at least each pod in the call chain except for a last pod in the call chain. The incoming service request requires a subsequent service request and a response from three or more pods in the call chain and the call chain includes the three or more pods in a linear sequence. The retry locker parameter of a pod of the call chain in the locked state prevents the pod from initiating retries of a service request to a subsequent pod of the call chain. The operations include, in response to determining that a status of a pod in the call chain is unavailable for responding to a service request from a previous pod in the call chain, setting the retry locker parameter to an unlocked state for the previous pod. The unlocked state allows a retry of a service request to the pod that is unavailable. The operations include, in response to the previous pod reaching a retry limit, setting the retry locker parameter to unlocked for each pod in the call chain and sending a service termination message to a service requester that sent the incoming service request.

In some embodiments, the operations include, in response to the previous pod receiving a response to a service request prior to reaching the retry limit, setting the retry locker parameter to unlocked for each pod in the call chain and responding to the incoming service request received at first pod in the call chain. In other embodiments, each pod includes an application configured to provide a response to a service request and a mesh network component facilitating communication between the application and other pods of the service mesh network. In other embodiments, a retry controller communicates with each mesh network component and a retry locker parameter status, a retry status, and a retry timeout status for each pod of the call chain is stored in a common metadata store. The retry controller sets the retry locker parameter for each pod of the call chain. In other embodiments, the mesh network components of each pod of the call chain communicate with each other and a retry locker of a pod sets the retry locker parameter for the pod in response to communications from at least one or more adjacent pods in the call chain.

Beneficially, the computer-implemented method, apparatus, and computer program product each solve the problems of the current state of known art by providing a convenient way to prevent retry storms. The computer-implemented method, apparatus, and computer program product each decreases delays when processing service requests where a call chain is created for the service requests. The computer-implemented method, apparatus, and computer program product each reduce execution time, and thus improve cloud computing solutions and other microservice computing solutions.

FIG. 1 is a schematic block diagram illustrating a computing environment 100 for gracefully resolving retry storms, according to various embodiments. The computing environment 100 contains an example of an environment for the execution of at least some of the computer code involved in performing the inventive methods, such as block 200, which is retry storm prevention code. In addition to block 200, the computing environment 100 includes, for example, a compute node 101 in a cloud computing environment 105, a wide area network ("WAN") 102, an end user device ("EUD") 103, and a remote server 104. In this embodiment, the compute node 101 includes a processor set 110 (including processing circuitry 120 and cache 121), communication fabric 111, volatile memory 112, persistent storage 113 (including operating system 122 and block 200, as identified above), and a peripheral device set 114 (including a user interface ("UI") device set 123, storage 124, and an Internet of Things ("IoT") sensor set 125). The remote server 104 includes a remote database 130. The cloud computing environment 105 includes a gateway 140, a cloud orchestration module 141, a host physical machine set 142, a virtual machine set 143, and a container set 144.

COMPUTE NODE 101 may take the form of a mainframe computer, a quantum computer or any other form of computer known or to be developed in the future that is capable of running a program, accessing a network or querying a database, such as a remote database 130. As is well understood in the art of computer technology, and depending upon the technology, performance of a computer-implemented method may be distributed among multiple computers and/or between multiple locations. On the other hand, in this presentation of the computing environment 105 of FIG. 1, detailed discussion is focused on a single computer, specifically compute node 101, to keep the presentation as simple as possible. In some embodiments, the compute node 101 is not located in a cloud, even though it is shown in a cloud in FIG. 1.

PROCESSOR SET 110 includes one, or more, computer processors of any type now known or to be developed in the future. Processing circuitry 120 may be distributed over multiple packages, for example, multiple, coordinated integrated circuit chips. The processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry 120. Alternatively, some, or all, of the cache for the processor set may be located "off chip." In some computing environments, processor set 110 may be designed for working with qubits and performing quantum computing.

Computer readable program instructions (e.g., code or program code) are typically loaded onto compute node 101 to cause a series of operational steps to be performed by the processor set 110 of the compute node 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 121 and the other storage media discussed below. The program instructions, and associated data, are accessed by the processor set 110 to control and direct performance of the inventive methods. In the computing environment 100 of FIG. 1, at least some of the instructions for performing the inventive methods may be stored in block 200 in persistent storage 113.

COMMUNICATION FABRIC 111 is a signal conduction path that allows the various components of the compute node 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory ("RAM") or static type RAM. Typically, volatile memory 112 is characterized by random access, but this is not required unless affirmatively indicated. In the compute node 101, the volatile memory 112 is located in a single package and is internal to the compute node 101, but, alternatively or additionally, the volatile memory may be distributed over multiple packages and/or located externally with respect to compute node 101.

PERSISTENT STORAGE 113 is any form of non-volatile storage for computers that is now known or to be developed in the future. The non-volatility of this storage means that the stored data is maintained regardless of whether power is being supplied to the compute node 101 and/or directly to the persistent storage 113. The persistent storage 113 may be a read only memory ("ROM"), but typically at least a portion of the persistent storage allows writing of data, deletion of data and re-writing of data. Some familiar forms of persistent storage include magnetic disks and solid-state storage devices. The operating system 122 may take several forms, such as various known proprietary operating systems or open source Portable Operating System Interface-type operating systems that employ a kernel. The code included in block 200 typically includes at least some of the computer code involved in performing the inventive methods. Block 200 is depicted in more detail in FIGS. 2A-2D.

PERIPHERAL DEVICE SET 114 includes the set of peripheral devices of compute node 101. Data communication connections between the peripheral devices and the other components of the compute node 101 may be implemented in various ways, such as Bluetooth connections, Near-Field Communication ("NFC") connections, connections made by cables (such as universal serial bus ("USB") type cables), insertion-type connections (for example, secure digital ("SD") card), connections made through local area communication networks and even connections made through wide area networks such as the internet. In various embodiments, the UI device set 123 may include components such as a display screen, speaker, microphone, wearable devices (such as goggles and smart watches), keyboard, mouse, printer, touchpad, game controllers, and haptic devices. The storage 124 is external data storage, such as an external hard drive, or insertable storage, such as an SD card. The storage 124 may be persistent and/or volatile. In some embodiments, the storage 124 may take the form of a quantum computing storage device for storing data in the form of qubits. In embodiments where the compute node 101 is required to have a large amount of storage (for example, where compute node 101 locally stores and manages a large database) then this storage may be provided by peripheral storage devices designed for storing very large amounts of data, such as a storage area network ("SAN") that is shared by multiple, geographically distributed computers. The IoT sensor set 125 is made up of sensors that can be used in Internet of Things applications. For example, one sensor may be a thermometer and another sensor may be a motion detector.

GATEWAY 140 is the collection of computer software, hardware, and firmware that allows the cloud computing environment 105 and/or the compute node 101 to communicate with other computers through a WAN 102. The gateway 140 may include hardware, such as modems or Wi-Fi signal transceivers, software for packetizing and/or de-packetizing data for communication network transmission, and/or web browser software for communicating data over the internet. In some embodiments, network control functions and network forwarding functions of the gateway 140 are performed on the same physical hardware device. In other embodiments (for example, embodiments that utilize software-defined networking ("SDN")), the control functions and the forwarding functions of the gateway 140 are performed on physically separate devices, such that the control functions manage several different network hardware devices. Computer readable program instructions for performing the inventive methods can typically be downloaded to the compute node 101 from an external computer or external storage device through a network adapter card or network interface included in the gateway 140, which may be on the compute node 101 or other device in the cloud computing environment 105.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks ("LANs") designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE ("EUD") 103 is any computer system that is used and controlled by an end user (for example, a customer of an enterprise that operates the compute node 101 or a virtual machine ("VM") on the compute node 101) and may take any of the forms discussed above in connection with the compute node 101. In some embodiments, the EUD 103, is a client. In other embodiments, the end user device 103 accesses two or more virtual machines. In some embodiments, the EUD 103 accesses one or more containers on the compute node 101. The EUD 103 typically receives helpful and useful data from the operations of the compute node 101. For example, in a hypothetical case where the compute node 101 is designed to provide a recommendation to an end user, this recommendation would typically be communicated from the gateway 140 of the cloud computing environment 105 and/or the compute node 101 through the WAN 102 to the EUD 103. In this way, the EUD 103 can display, or otherwise present, the recommendation to an end user. In some embodiments, the EUD 103 may be a client device, such as thin client, heavy client, mainframe computer, desktop computer and so on.

REMOTE SERVER 104 is any computer system that serves at least some data and/or functionality to the compute node 101. The remote server 104 may be controlled and used by the same entity that operates the compute node 101. The remote server 104 represents the machine(s) that collect and store helpful and useful data for use by other computers, such as the compute node 101. For example, in a hypothetical case where the compute node 101 is designed and programmed to provide a recommendation based on historical data, then this historical data may be provided to the compute node 101 from the remote database 130 of the remote server 104.

CLOUD COMPUTING ENVIRONMENT 105 is a computer system available for use by a single private entity or by one or more entities that provides on-demand availability of computer system resource and/or other computer capabilities, especially data storage (cloud storage) and computing power, without direct active management by the user. Where the cloud computing environment 105 is a public cloud, in some embodiments, the computer system is available for use by one or more entities. Cloud computing typically leverages sharing of resources to achieve coherence and economies of scale. The direct and active management of the computing resources of the cloud computing environment 105 is performed by the computer hardware and/or software of a cloud orchestration module 141. The computing resources provided by the cloud computing environment 105 are typically implemented by virtual computing environments that run on various computers making up the computers of a host physical machine set 142, which is the universe of physical computers in and/or available to cloud computing environment 105 and one of which may be the compute node 101. The virtual computing environments ("VCEs") typically take the form of virtual machines from a virtual machine set 143 and/or containers from a container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. The gateway 140 is the collection of computer software, hardware, and firmware that allows cloud computing environment 105 to communicate through the WAN 102.

Some further explanation of virtualized computing environments ("VCEs") will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

A private cloud is similar to public cloud, except that the computing resources are only available for use by a single enterprise. Where the cloud computing environment 105 is a private cloud, in other embodiments the cloud computing environment 105 as a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In some embodiments, a public cloud and a private cloud are both part of a larger hybrid cloud, which may be the public or private cloud in a cloud computing environment 105.

Figure 2A:
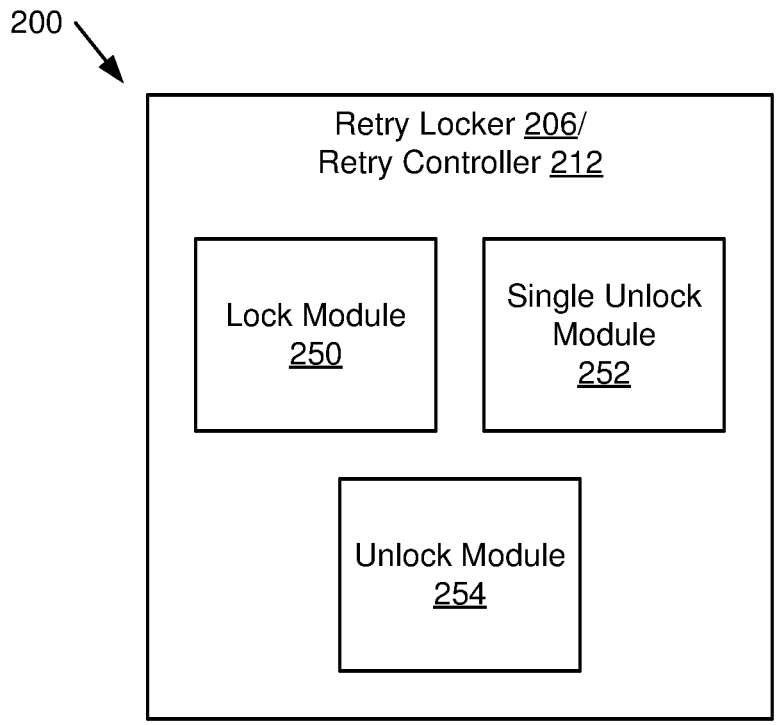
FIG. 2A is a schematic block diagram illustrating an apparatus for implementing a block of code for gracefully resolving retry storms, according to various embodiments.

FIG. 2A is a schematic block diagram illustrating an apparatus for implementing a block of code 200 for gracefully resolving retry storms with central control, according to various embodiments. The block of code 200 includes a retry locker 206 and/or a retry controller 212 that includes a lock module 250, a single unlock module 252, and an unlock module 254, which are described below. In some embodiments, the block of code 200 in the form of a the retry locker 206/retry controller 212 are implemented with executable code stored on a computer readable storage media. The lock module 250, the single unlock module 252, and the unlock module 254, in some embodiments, are distributed between retry lockers 206 of pods 202 (see FIGS. 2C, 2D) in a call chain and the retry controller 212 of a compute node 101. Where no retry controller 212 is included, the lock module 250, the single unlock module 252, and the unlock module 254 are part of the retry lockers 206 of the pods 202 (see FIG. 2D).

In some embodiments, two or more compute nodes 101 (e.g., 101a, 101b of FIG. 2D) include retry lockers 206 and/or retry controllers 212. In some embodiments, the retry lockers 206 and/or retry controllers 212 are part of a service mesh network. In some embodiments, the retry lockers 206 and/or retry controller 212 are implemented with a programmable hardware device, such as a field programmable gate array ("FPGA") or the like. One of skill in the art will recognize other ways that retry lockers 206 and/or retry controllers 212 may be implemented. The lock module 250, single unlock module 252, and unlock module 254, as implemented in retry lockers 206 and/or a retry controller 212 explained below, beneficially provide a graceful way to prevent retry storms by reducing delays in processing service requests when a service is unavailable while still allowing a reasonable number or retries.

Figure 2B:
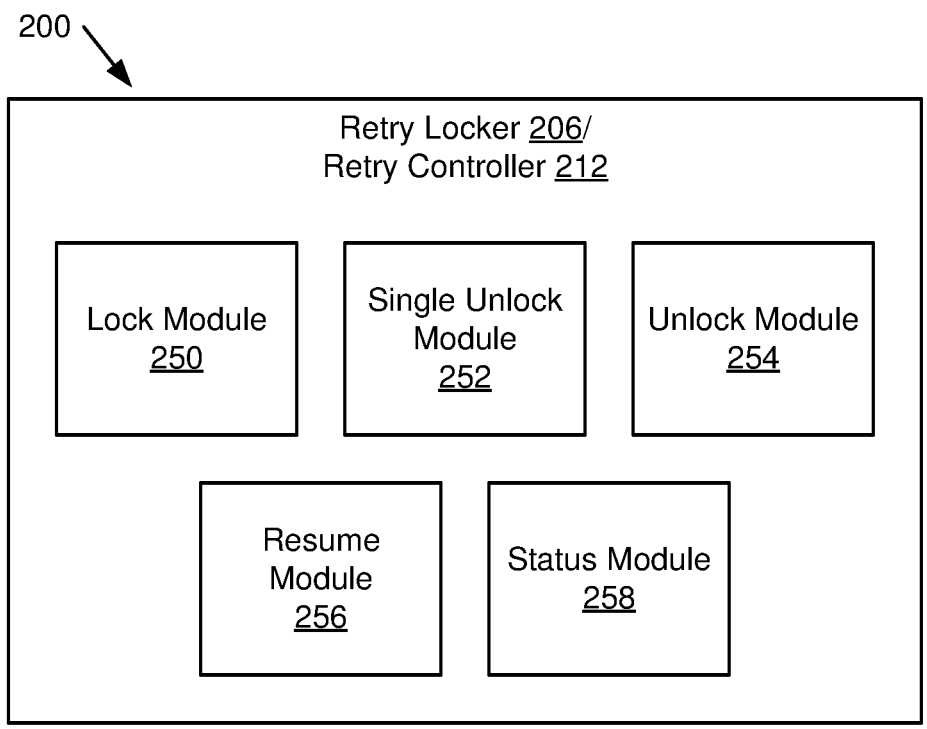
FIG. 2B is a schematic block diagram illustrating another apparatus for implementing a block of code for gracefully resolving retry storms, according to various embodiments.
Figure 2C:
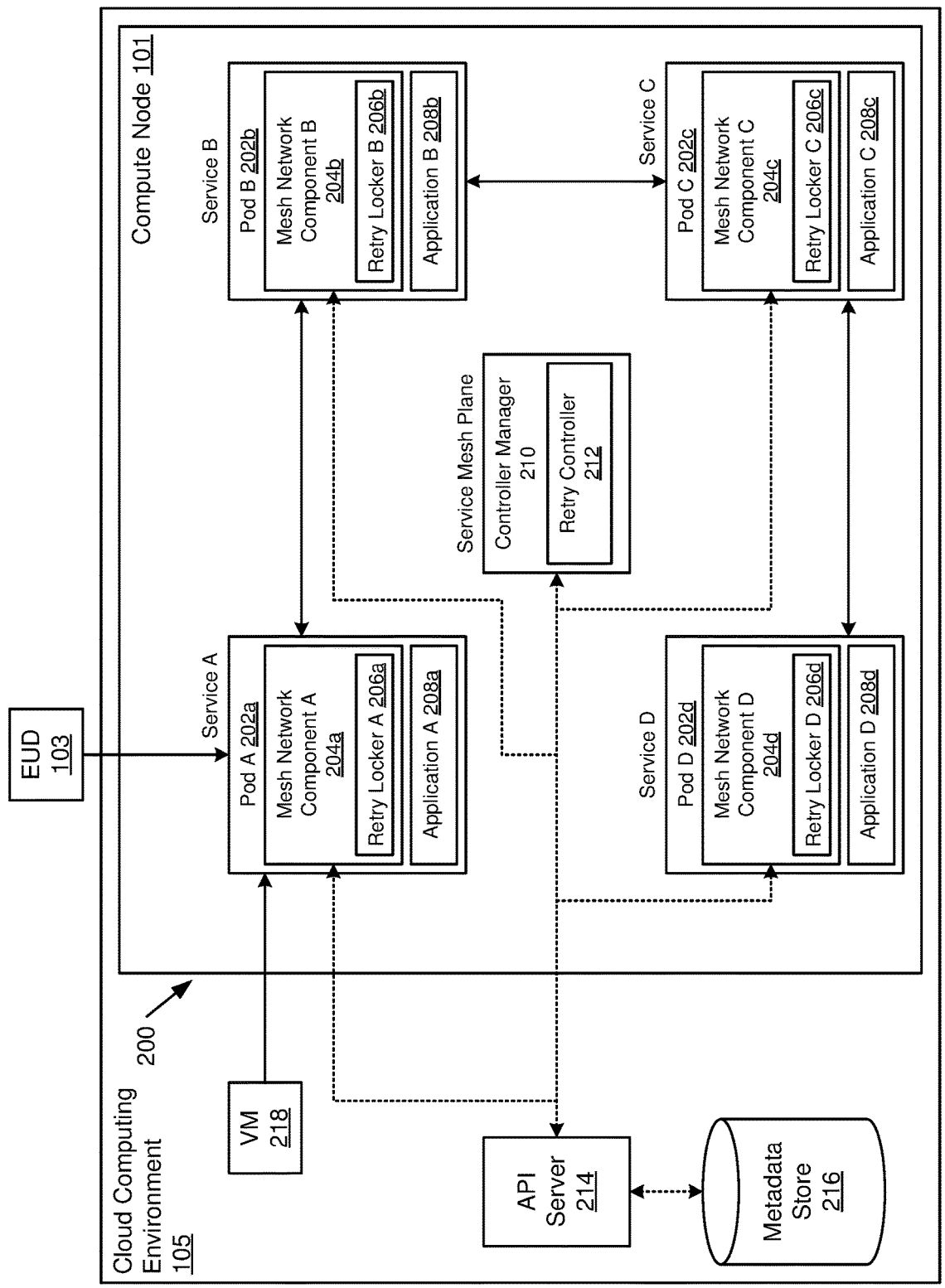
FIG. 2C is a schematic block diagram illustrating an apparatus in a compute node for implementing a block of code for gracefully resolving retry storms with central control, according to various embodiments.
Figure 2D:
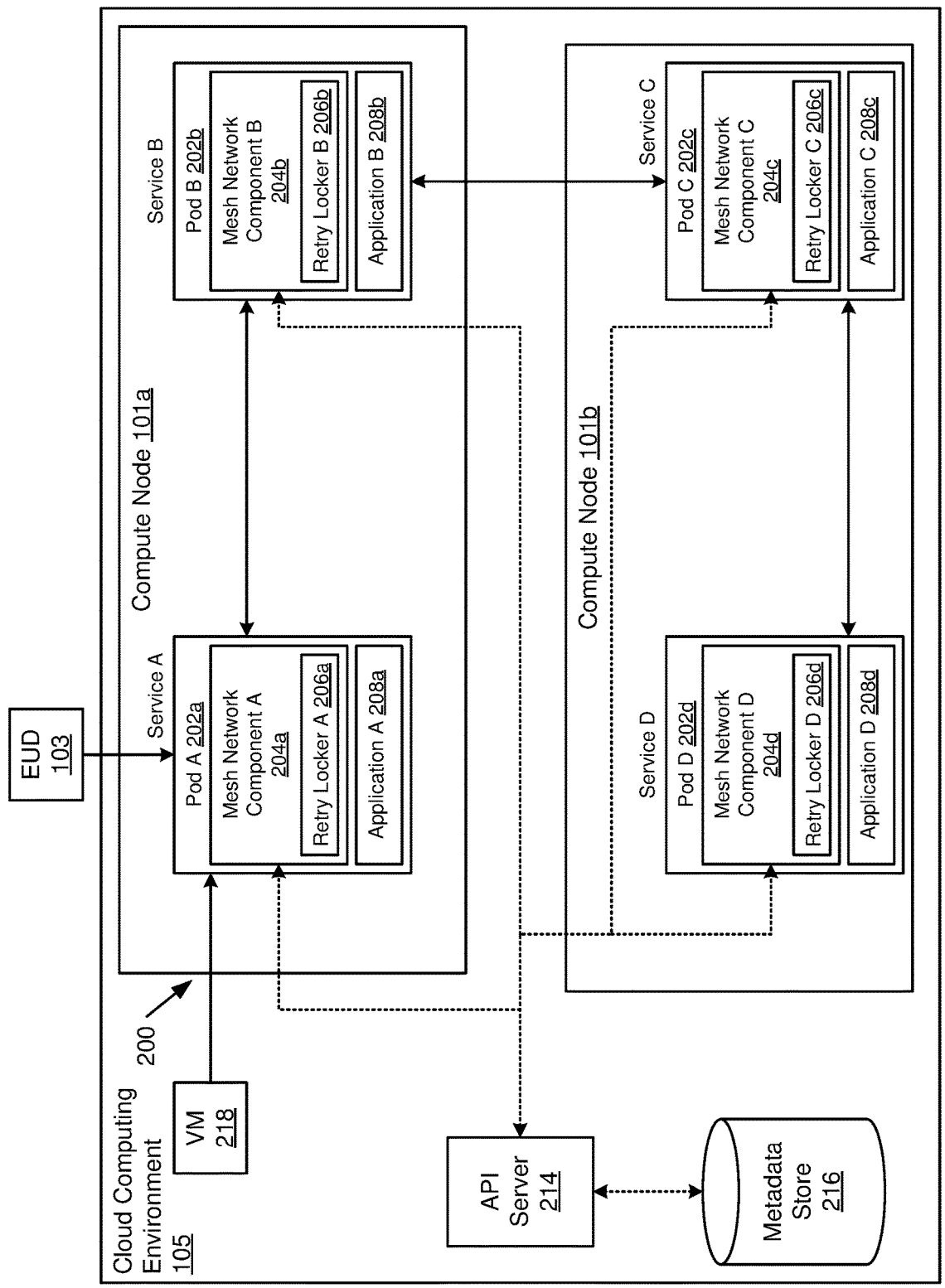
FIG. 2D is a schematic block diagram illustrating an apparatus in multiple compute nodes for implementing a block of code for gracefully resolving retry storms with distributed control, according to various embodiments.

FIG. 2B is a schematic block diagram illustrating another apparatus for implementing a block of code 200 for gracefully resolving retry storms, according to various embodiments. The block of code 200 of FIG. 2B includes a retry locker 206 and/or a retry controller 212 with a lock module 250, a single unlock module 252, and an unlock module 254, which are substantially similar to those described above in relation to the block of code 200 of FIG. 2A. In addition, the block of code 200 of FIG. 2B includes a resume module 256 and/or a status module 258, which are described below. The block of code 200 of FIG. 2B is implemented similar to the block of code 200 of FIG. 2A. FIGS. 2C and 2D provide additional context for the retry lockers 206 and retry controller 212 of FIGS. 2A and 2B.

FIG. 2C is a schematic block diagram illustrating an apparatus in a compute node 101 for functionally implementing a block of code 200 for gracefully resolving retry storms, according to various embodiments. In FIG. 2C, the block of code 200 is depicted as being part of a compute node 101 in the form of retry lockers 206 and a retry controller 212. The compute node 101 includes multiple pods (e.g., pod A 202a, pod B 202b, pod C 202c, and pod D 202d (generically or collectively "pod 202")). The pods 202 are part of a service mesh network. In some embodiments, a pod 202 is a unit in a service mesh network.

In some embodiments, the service mesh network is implemented with Istio®, which is an open platform to connect, manage and secure microservices. Istio provides a uniform way to integrate microservices, manage traffic flow across microservices, enforce policies, aggregate telemetry data, and the like. In other embodiments, the service mesh network may be implement using Linkerd®, Consul Connect™, Kuma®, Maesh®, or the like.

In some embodiments, the service mesh networks are also implemented in Kubernetes®. In other embodiments, the service mesh network is implemented with AWS Fargate®, Azure Container Instances™, Google Cloud Run™, Google Kubernetes Engine™ ("GKE"), Amazon Elastic Kubernetes Service™ ("EKS"), or the like. In some embodiments, a pod 202 includes one or more containers. A container is a lightweight, standalone, executable package of software that includes what is needed to run an application.

A pod 202 provides environmental dependencies, such as persistent storage 113, represented in FIG. 2C as a metadata store 216, that is available to pods 202 in a cluster. Pods 202 also include configuration data needed to run the containers within the pods 202. By limiting pods 202 to a single process, the service mesh network is able to report on the health of each process running a cluster of pods 202. In some embodiments, pods 202 include a unique internet protocol ("IP") address, have access to persistent storage 113 (e.g., metadata store 216), and configuration information that determines how a container should run. Often a pod 202 will include a single container, but some pods 202 include multiple containers.

The service mesh network runs on one or more compute nodes 101 and provides microservices, which provide a useful development method. Containers and container orchestrators provide convenient deployment and scalability such that pods 202 include their own runtimes, executing containers, and mapping to machines, such as a compute node 101. A service mesh network provides a uniform networking capability across a stack in a way that is decoupled from application code. A microservice or service may include business logic functions, primitive network functions, application network functions, mathematic functions and the like. Often a service/microservice is complex. Rather than having known functions in an application 208 of a pod 202 (e.g., pod A 202a), some known functions reside in other pods (e.g., 202b, 202c, 202d, etc.). A second tier of services (e.g., in pod B 202b) may then call on a third tier of services (e.g., pod C 202c), which calls on a fourth tier of services (e.g., pod D 202d), and thus a call chain is required.

Each pod 202 includes a mesh network component (e.g., mesh network component A 204a, mesh network component B 204b, mesh network component C 204c, mesh network component D 204d (generically or collectively "mesh network component 204")) and an application (e.g., application A 208a, application B 208b, application C 208c, application D 208d (generically or collectively "application 208")). Each pod 202 provides a service. In some examples, pod A 202a is service A, pod B 202b is service B, pod C 202c is service C, and pod D 202d is service D. Other service mesh networks include fewer services or a greater number of services than those of FIG. 2C.

A mesh network component 204 provides an interface between an application 208 and other components of service mesh network, such as other pods 202, an end user device 103, a virtual machine ("VM") 218, etc. A mesh network component 204 mediates inbound and outbound communication to the application 208 to which it is attached. In some embodiments, each mesh network component 204 is implemented as an Istio Sidecar™. In other embodiments, the mesh network component 204 is implemented with another mesh software.

In the embodiments depicted in FIG. 2C, the service mesh network includes a controller manager 210 in a service mesh plane that is in communication with each mesh network component 204 and/or an application program interface ("API") server 214. FIG. 2D is a schematic block diagram illustrating an apparatus in multiple compute nodes 101a, 101b for implementing a block of code 200 for gracefully resolving retry storms with distributed control, according to various embodiments. In the embodiments of FIG. 2D, a controller manager 210 is not included and the mesh network components 204 include functionality of a central controller manager 210. In other embodiments, the block of code 200 is implemented on more than one compute node 101 and includes a retry controller 212 on some or all of the compute nodes 101.

Figures 3, 4:
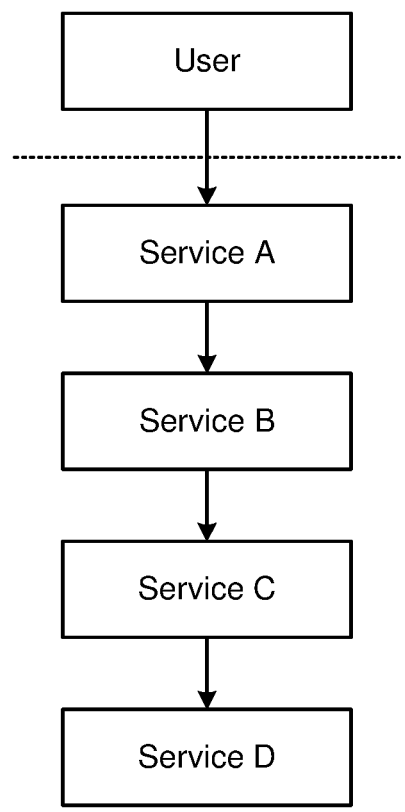
FIG. 3 is an example of a transaction log with establishing a call chain, according to various embodiments.
FIG. 4 is a schematic block diagram illustrating a call chain, according to various embodiments.

An incoming service request is initiated by a user, an application, or the like and is received by the first pod A 202a. The incoming service request may come by way of an EUD 103, a virtual machine ("VM"), or other source requesting a service. In some embodiments, the EUD 103 sends an incoming service request to the VM 218, which forwards the incoming service request to a pod 202 of the compute node 101. In other embodiments, the EUD 103 sends a workload or other request to the VM 218, which results in an incoming service request to a pod 202 of the compute node 101. In some embodiments, mesh network components 204 and/or a controller manager 210 is to set up a call chain of services when a multiple services are called in a linear sequence. In other embodiments, the lock module 250 or other component of the block of code 200 sets up the call chain. In the embodiments of FIGS. 2C and 2D, service A calls service B, service B calls service C, and service C calls service D. FIG. 3 is an example of a transaction log with establishing a call chain, according to various embodiments. FIG. 3 depicts a transaction number and events in a service mesh event log. In some embodiments, the call chain is constructed from information in the call log.

FIG. 4 is a schematic block diagram illustrating a call chain, according to various embodiments. An incoming service request comes from a user, which may be from an EUD 103, VM 218, or the like. The call chain depicts a linear sequence of services where, in response to a service request into pod A 202a that includes service A, pod A 202a calls pod B to access service B, which calls pod C 202c to access service C, which calls pod D 202d to access service D. While a single linear path is depicted from service A to service B to service C to service D, other embodiments may include other paths between services that also include a linear path from a first pod 202 to a last pod 202. For example, in addition to pod A 202a calling pod B 202b to access service B, pod A 202a may also access pod E with service E (not shown), which may then send a service request to pod F with service F. Embodiments described herein also anticipate more complex call chains and the term "linear sequence" includes a call chain such as in FIG. 4 but also includes more complex call chains where there is a string of services in a chain from a first pod 202 to a last pod 202 that is unavailable.

The mesh network components 204 and/or a controller manager 210 (or alternatively the lock module 250) establish call chain in response to a first pod (e.g., pod A 202a) of a service mesh network receiving a service request and a response from multiple pods of the service mesh network in a linear sequence. The call chain includes a particular sequence of the services/pods 202 to be called based on a service request to the first pod (e.g., pod A 202a).

The application 208 running in each pod, in some embodiments, provides a service in response to a service request. Some applications 208 place service requests to other services to get information for a service request being processed by the applications 208. For example, application A 208a (e.g., service A) may send a service request to pod B 202b that includes application B 208b providing service B. Likewise, application B 208b may send a service request to pod C 202c with application C 208c providing service C. Application C 208c may then send a service request to pod D 202d with application D 208d providing service D.

A problem arises when a service in a call chain has an outage where a service from a pod 202 is unavailable. The service being unavailable may be for various reasons. In some embodiments, the application 208 of a pod 202 may have crashed, gotten hung up, may be executing slowly, etc. which prevents the application 208 from proving a response to a service request. In other embodiments, the service being unavailable is caused by the mesh network component 204 of a pod 202 crashing, running slowly, losing a communications connection, etc. In other embodiments, an outage where service from a pod 202 is unavailable is caused by a power outage, by a wrong response from an application 208 of a pod 202, a communication failure, or other reason that the pod 202 is unable to respond to a service request. One of skill in the art will recognize other reasons for an outage of a pod 202 where a service is unavailable.

Typically, when a previous pod 202 (e.g., pod C 202c) determines that a next pod (e.g., pod D 202d) is unavailable, the pod (e.g., pod C 202c) prior to the pod (e.g., pod D 202d) with the outage resends a service request at a particular interval based on a retry policy. As used herein, a "previous pod" 202 is a pod (e.g., 202c) just prior to a pod (e.g., 202d) that is unavailable. Typically, a retry policy will include a retry limit, such as 3, and a retry timeout, such as 10 seconds. Where there are several pods 202 in a call chain, retries can multiply causing a significant delay. For example, where a retry policy has a retry limit of 3 for each pod 202 in the call chain of service A to service B to service C to service D in FIG. 2C, pod C 202c will retry three times for each service request from pod B 202b and pod B 202b will retry 3 times for each service request from pod A 202a. This could result in 27 retries from previous pod C 202c where pod D 202d is unavailable along with 9 retries from pod B 202b and 3 retries from pod A 202a. Thus, retries can increase nearly exponentially based on the retry limit of the pods 202 and the number of pods 202 in a call chain, and this situation can be called a retry storm, which is when retries become excessive or more than desired.

The block of code 200 provides a solution that prevents, in some circumstances, a retry storm by limiting the number of retries when a pod (e.g., pod D 202d) is unavailable to provide a service (e.g., service D). The block of code 200 includes, in some embodiments, a retry locker in each pod 202 (e.g., retry locker A 206a in pod A 202a, e.g., retry locker B 206b in pod B 202b, e.g., retry locker C 206c in pod C 202c, and e.g., retry locker D 206d in pod D 202d (collectively or generically "retry locker 206")). In some embodiments, the block of code 200 also includes a retry controller 212 in communication with each retry locker 206. The retry lockers 206 and/or retry controller 212 provide functionality to reduce the number of retries when a pod 202 in a call chain is unavailable. The modules of FIGS. 2A and 2B are implemented in the retry lockers 206 and/or retry controller 212.

The retry locker 206/retry controller 212 include a lock module 250 configured to, in response to receiving an incoming service request and establishing a call chain of a service mesh network, set a retry locker parameter to a locked state for each pod 202 in the call chain. Where an incoming service request is received by pod A 202a and the incoming service request requires additional services from other pods 202, such as pod B 202b, pod C 202c, and pod D 202d, the service mesh network establishes a call chain. The controller manager 210 or other component such as the mesh network components 204 or API server 214 may establish the call chain. In other embodiments, the lock module 250 establishes the call chain.

Where an incoming service request requires a subsequent service request and a response from three or more pods 202 in the call chain and the call chain includes the three or more pods 202 in a linear sequence, the lock module 250 sets the retry locker parameter to locked for at least each pod 202 in a call chain except for the last pod D 202d of the call chain. Setting the retry lock parameter to the locked state in the last pod D 202d is not required because there is no follow-on service to retry. In some embodiments, the lock module 250 also sets the retry lock parameter to the locked state for the last pod D 202d for convenience. Thus, setting the retry lock parameter to the locked state is mandatory for pods 202a, 202b, 202c in the call chain except for the last pod 202d, but is optional for the last pod 202d in the call chain. The retry locker parameter of a pod 202 of the call chain in the locked state prevents the pod 202 from initiating retries of a service request to a subsequent pod 202 of the call chain. For example, where service A of pod A 202a has a retry lock parameter set to the locked state, pod A 202a will not retry service requests to Service B in pod B 202b.

The retry locker 206/retry controller 212 include a single unlock module 252 configured to, in response to determining that a status of a pod 202 in the call chain is unavailable for responding to a service request from a previous pod 202 in the call chain, set the retry locker parameter to an unlocked state for the previous pod 202 just prior to the pod 202 that is unavailable. The unlocked state allows a retry of a service request to the pod 202 that is unavailable. For example, where pod D 202d is unavailable, the single unlock module 252 sets the retry locker parameter for previous pod C 202c to the unlocked state, which then allows pod C 202c to initiate retries of a service request. Typically, each pod 202 will include a per try timeout that spaces retries by some amount of time. For example, if a per try timeout is set to 10 seconds for pod C 202c, then pod C 202c will initiate a retry every 10 seconds. In addition, each pod 202 typically includes a retry limit. Where the retry limit is 3, then after 3 retries the pod 202 will stop retries of the service request and may indicate failure of the service request. For example, with the retry locker parameter set to unlocked, the retry limit set to 3 and the per try timeout set to 10 seconds pod C 202c will send a service request to pod D 202d every 10 seconds after an initial service request and until reaching a retry counter for pod C 202c reaches three.

The retry locker 206/retry controller 212 include an unlock module 254 configured to, in response to the previous pod 202 in the call chain prior to the pod 202 that is unavailable reaching a retry limit, set the retry locker parameter to unlocked for each pod 202 in the call chain and send a service termination message to a service requester that sent the incoming service request. In prior art service mesh networks, after reaching a retry limit, the pod reaching the limit sends a service failure message to a previous pod or the previous pod reaches a timeout, either or both of which then initiate a retry. This pattern sets off a retry storm. The unlock module 254 sets the retry locker parameters to unlocked, which signals termination of the service request and the unlock module 252 sends the termination message to the service requester that sent the original service request. Thus, the lock module 250, single unlock module 252, and unlock module 254 provide a way to prevent retry storms by preventing retries by pods 202 other than the pod 202 just before a pod that is unavailable. The unlock module 254 sends a termination message to the service requestor without excessive retries.

In some embodiments, the retry locker 206/retry controller 212 include a resume module 256 configured to, in response to the previous pod 202 in the call chain just prior to the pod 202 that is unavailable receiving a response to a service request prior to reaching the retry limit, set the retry locker parameter to unlocked for each pod 202 in the call chain. The pods 202 in the service chain respond in turn to the service requests received by each pod 202 of the call chain, including the incoming service request received at a first pod 202 in the call chain. For example, where pod D 202d resumes operation and sends a response before pod C 202c reaches the retry limit and subsequent per try timeout, the resume module 256 sets the retry locker parameter to unlocked for pods B 202b and pod A 202a. Pod C 202c is then able to respond to the service request from pod B 202b and pod B is then able to respond to the incoming service request from pod A 202a. Pod A 202a is then able to respond to the received service request from service requester (e.g., EUD 103, VM 218). The resume module 256 beneficially provides a way to reset the retry locker parameters in anticipation of either normal response to service requests or for subsequent interruptions of a service.

In some embodiments, the retry locker 206/retry controller 212 include a status module 258 configured to determine a status of the retry locker parameter, a retry counter, and a timeout counter of each pod 202 of the call chain prior to setting the retry locker parameter for each pod 202 of the call chain. The status of the retry locker parameter, the retry counter, and the timeout counter of each pod 202 of the call chain are stored in a metadata store 216. The status module 258 provides a mechanism for the retry controller 212 and/or retry lockers 206 to keep track of a current status of the retry locker parameter, a retry counter, and a timeout counter of each pod 202 of the call chain by checking the metadata store 216. In some embodiments, the lock module 250, the single unlock module 252, the unlock module 254, and the resume module 256 also access and update the metadata store 216 with the status of the retry locker parameter, a retry counter, and a timeout counter of each pod 202 of the call chain and may also access and update other parameters associated with the pods 202 of the call chain.

Figure 5:
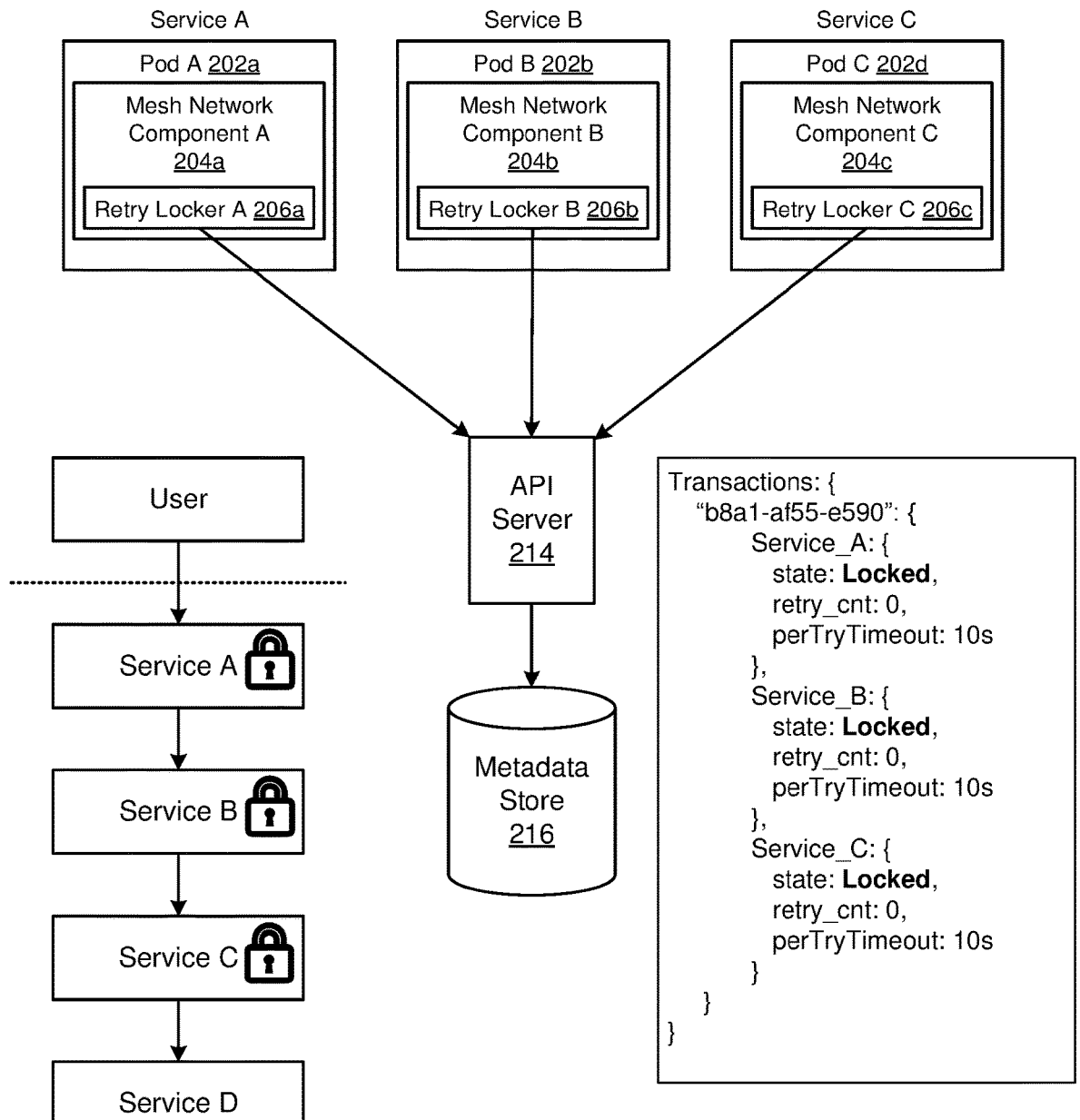
FIG. 5 is a schematic block diagram illustrating locking of pods in a call chain transitioning to a locked state, according to various embodiments.

FIGS. 5-10 depict various elements of the components of FIGS. 2A and 2B in an example where service D is unavailable. FIG. 5 is a schematic block diagram illustrating locking of pods 202 in a call chain transitioning to a locked state, according to various embodiments. Initially, the status module 258 which is in the retry controller 212 and/or the retry lockers 206 update a current status of the retry locker parameter (depicted in FIGS. 5-10 as "state"), the retry counter (depicted in FIGS. 5-10 as "retry_cnt"), and a timeout counter (depicted in FIGS. 5-10 as "perTryTimeout") in the metadata store 216, which may be done periodically for various pods 202.

The lock module 250, which is implemented in the retry lockers 206a-c in pods A-C 202a-c and/or the retry controller 212 set the retry locker parameter ("state" in FIG. 5) to a locked state for pods A-C 202a-c. The retry locker parameter in Pod D 202d is not updated because having pod D in a locked does not affect any other pods 202 due to the position of pod D 202d in the call chain.

Note that a call chain is applicable to a single service request and each service request where a call chain is constructed of three or pods 202 in a linear sequence includes a separate call chain. Each call chain with three or more pods 202 in a linear sequence may benefit from the embodiments described herein, including other call chains that include some pods not linearly dependent on each other. For example, a call chain may include service A sending a service request to service B and service F, service B sending a service request to service C and service C sending a service request to service D. Services A-D are in a linear sequence that may cause a retry storm while retries to service F would typically be limited to the retry limit of service A. For each call chain, the retry lockers 206 and/or retry controller 212 set a retry locker parameter specific to that call chain.

The call chain is depicted on the left with services A-C in a locked state. Sample code is on the right showing the transaction ID, which matches the transaction ID in the transaction log of FIG. 3 and identifies the particular call chain that, in the depicted example, is the sequence from service A to service B to service C to service D. Note that the code depicts the state variable (e.g., retry locker parameter) being set to Locked. While FIG. 5 depicts pod A 202a, pod B 202b, and pod C 202c in communication with the API server 214, in other embodiments, pod A 202a, pod B 202b, and pod C 202c set the status parameter to locked without the API server 214, for example when the metadata store 216 is in the compute node 101.

Figure 6:
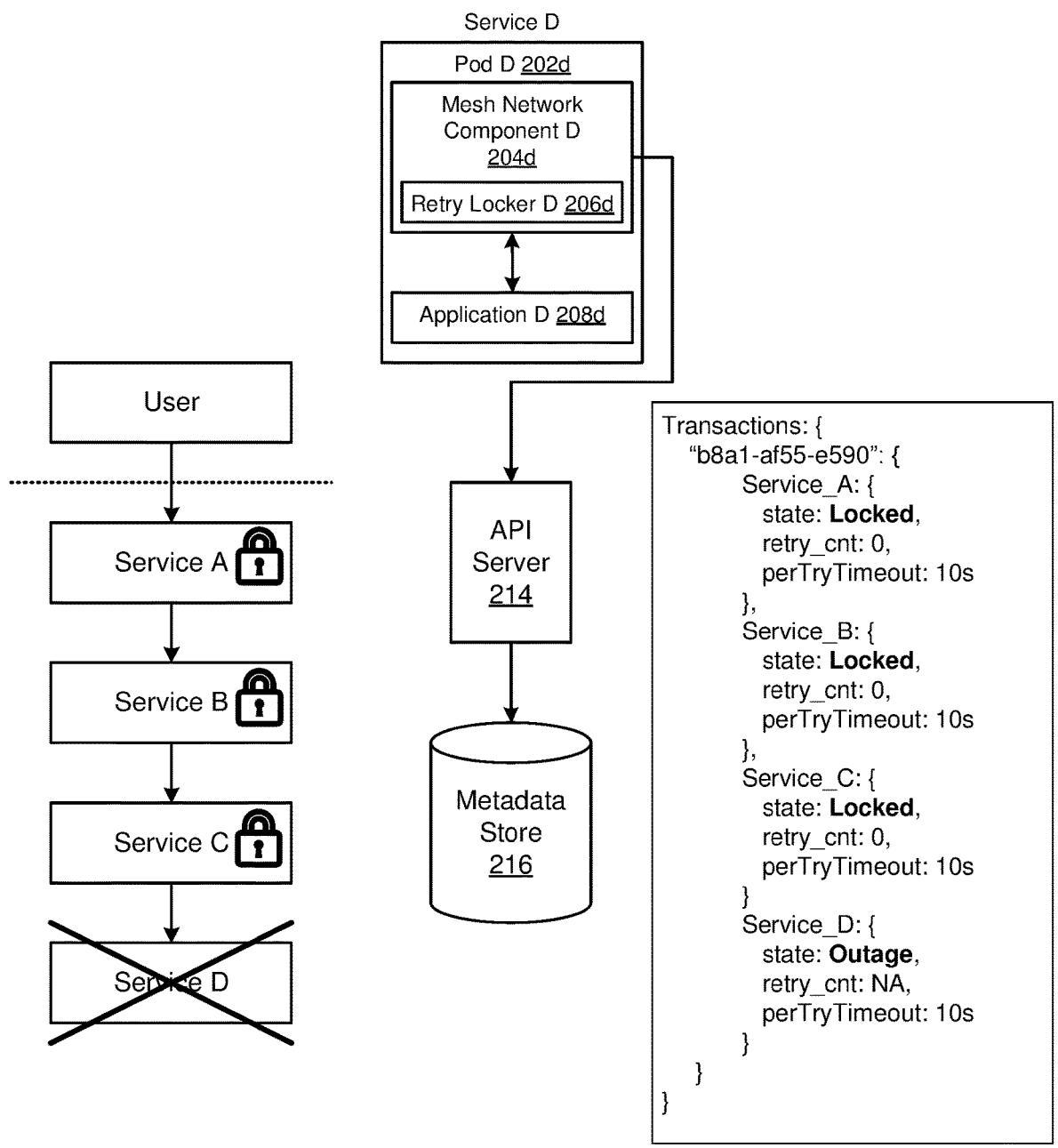
FIG. 6 is a schematic block diagram illustrating determining that a service of a call chain is unavailable, according to various embodiments.

FIG. 6 is a schematic block diagram illustrating determining that a service of a call chain is unavailable, according to various embodiments. In the depicted embodiment, the mesh network component D 204d communicates with the application D 208d that provides service D and determines that application D 208d is unavailable. In other embodiments, the mesh network component C 204c in pod C 202c determines that service D/application D 208d is unavailable. In other embodiments, the controller manager 210 determines that service D/application D 208d is unavailable. The call chain on the left in FIG. 6 indicates that service D is unavailable and the transaction code on the right shows the status of services A-C as locked while the status of service D is shown as "outage," meaning that service D is unavailable.

Figure 7:
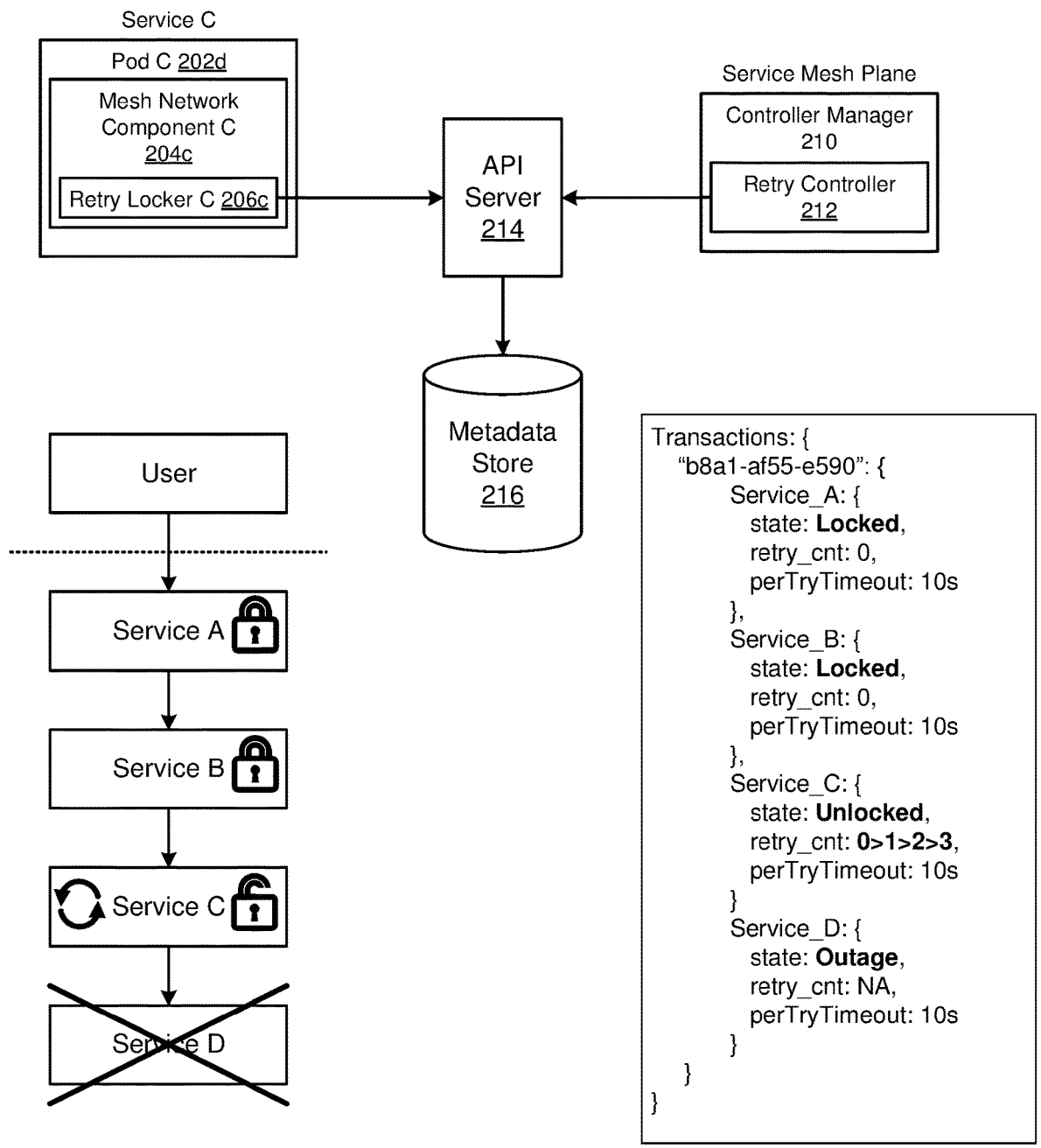
FIG. 7 is a schematic block diagram illustrating unlocking a service prior to a service that is unavailable, according to various embodiments.

FIG. 7 is a schematic block diagram illustrating unlocking a service prior to a service that is unavailable, according to various embodiments. The single unlock module 252, through the retry controller 212 and/or the retry locker C 206c, sets the retry locker parameter ("state") for pod C 202c to unlocked. FIG. 7 depicts the retry controller 212 and pod C 202c communicating with the API server 214 and metadata store 216 to update parameters of the call chain. In some embodiments, the retry controller 212 sets the status parameter in pod C 202c to unlocked. In other embodiments, the retry locker C 206c sets the status parameter in pod C 202c to unlocked.

After the status parameter in pod C 202c is set to unlocked, pod C 202c commences retries by resending the service request originally sent by pod C 202c to pod D 202d. Retry locker C 206c updates retry_cnt parameter for each retry, which is depicted as 1>2>3, meaning that the retry_cnt parameter start at 1, then goes to 2, then to 3.

Figure 8:
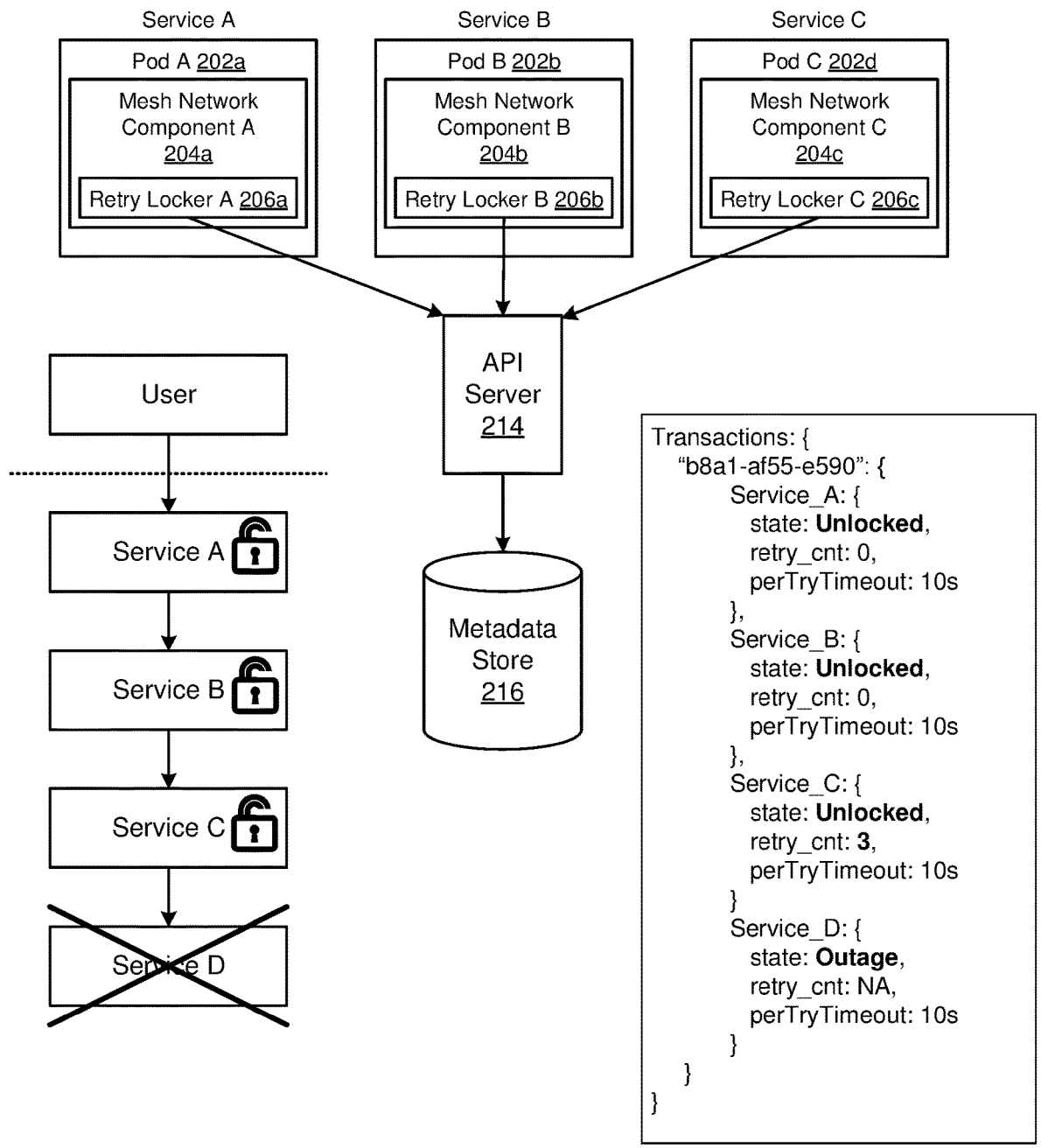
FIG. 8 is a schematic block diagram illustrating unlocking services of a call chain in response to the service prior to the service with an outage reaching a retry limit, according to various embodiments.

FIG. 8 is a schematic block diagram illustrating unlocking services of a call chain in response to the service prior to the service with an outage reaching a retry limit, according to various embodiments. Once the retry counter for pod C 202*c* (e.g., the retry_cnt parameter) reaches three and the retry counter for pod C 202*c* reaches the timeout limit of 10 seconds (depicted as perTryTimeout), the unlock module 254, through the retry locker A 206*a*, retry locker B 206*b*, and/or the retry controller 212, sets the state parameter for pod A 202*a* and pod B 202*b* to unlocked and sends a service termination message to a service requester that sent the service request, which may be the EUD 103, VM 218 or other device that sent the service request. Beneficially, the lock module 250, the single unlock module 252, and the unlock module 254 prevent pod A 202*a* and pod B 202*b* from initiating unnecessary retries, which reduces execution time when a service is unavailable.

Figure 9:
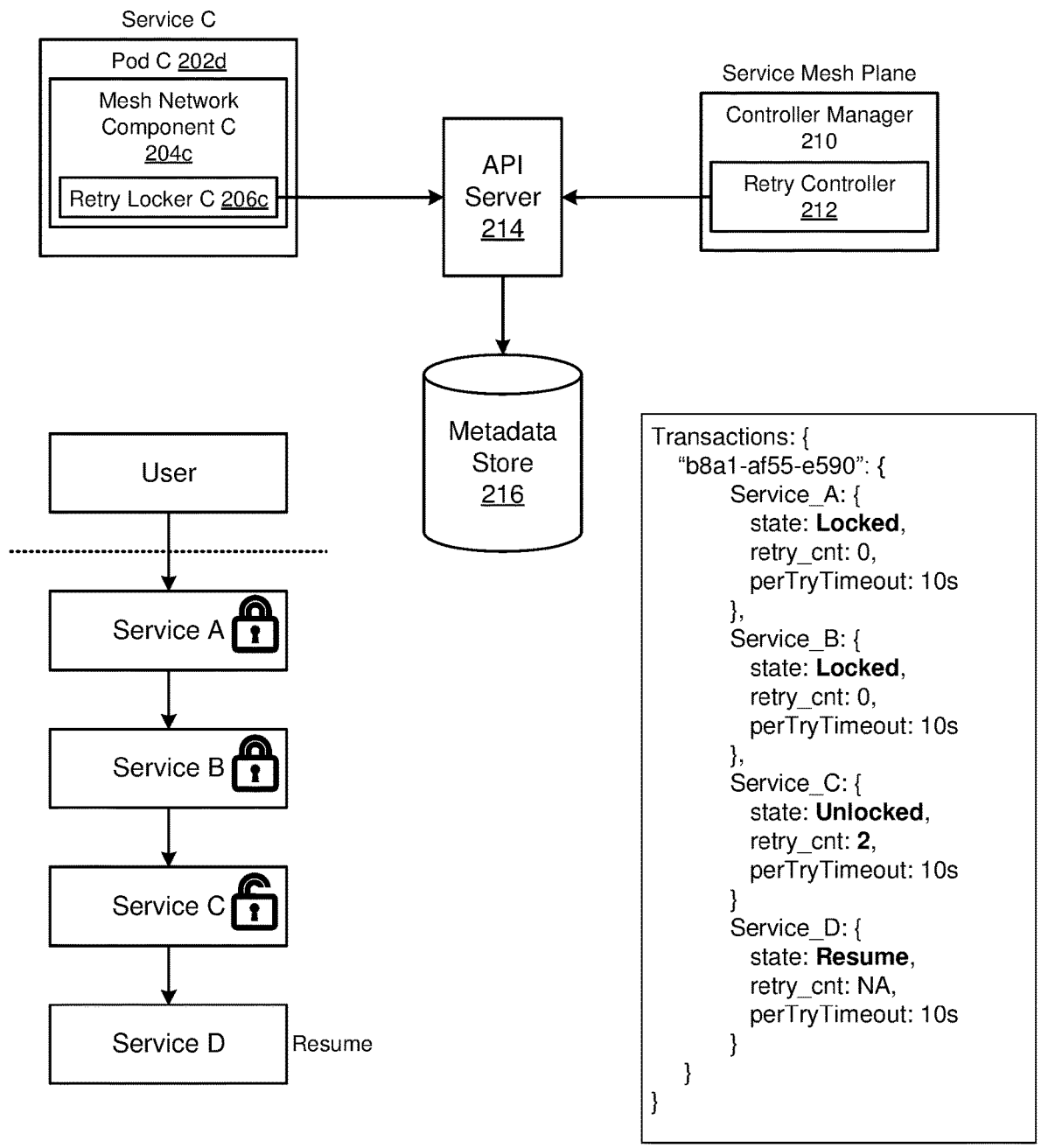
FIG. 9 is a schematic block diagram illustrating determining that a service that was unavailable is resuming operation, according to various embodiments.

FIG. 9 is a schematic block diagram illustrating determining that a service that was unavailable is resuming operation, according to various embodiments. In the example, service D resumes prior to pod C 202*c* reaching a retry limit, which may be set to 3. As depicted, the retry_cnt parameter is 2 and the status of service D is "resume." In some embodiments, the mesh network component D 204*d* in pod D 202*d* sets the status of pod D 202*d* to "resume" in response to receiving a response from Application D 208*d*, which is then sent to pod C 202*c*. In other embodiments, the mesh network component C 204*c* in pod C 202*c* sets the status of pod D 202*d* to "resume" in response to receiving a response from pod D 202*d*. One of skill in the art will recognize other ways to determine that the pod 202 that was unavailable is again available to send responses.

Figure 10:
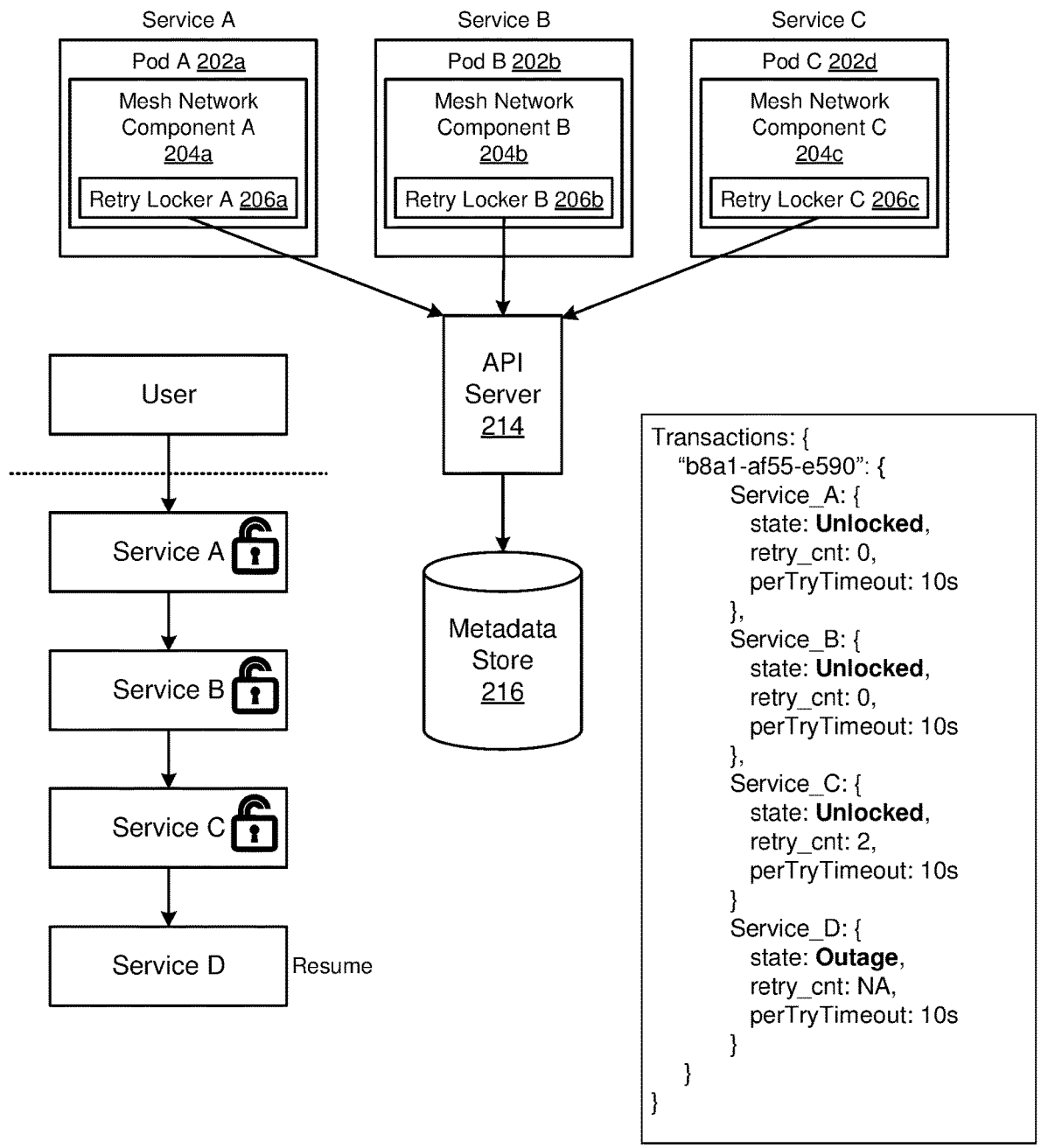
FIG. 10 is a schematic block diagram illustrating unlocking services in a call chain in response to the service that was unavailable resuming operation, according to various embodiments.

FIG. 10 is a schematic block diagram illustrating unlocking services in a call chain in response to the service that was unavailable resuming operation, according to various embodiments. In response to determining that pod D 202*d* has resumed providing responses to service requests, the resume module 256, through retry locker B 206*b*, retry locker A 206*a*, and/or the retry controller 212, sets the retry locker parameter ("status") for pod A 202*a* and pod B 202*b* to unlocked. In addition, by way of the mesh network components 204, pod C 202*c* typically sends a response to pod B 202*b* after receiving a response from pod D 202*d* and then pod B 202*b* sends a response to pod A 202*a* in response to receiving a response from pod C 202*c*. Pod A 202*a* is then able to send a response to the service request back to the EUD 103, VM 218, or other service requester, and the service request is terminated along with the associated call chain.

Figure 11:
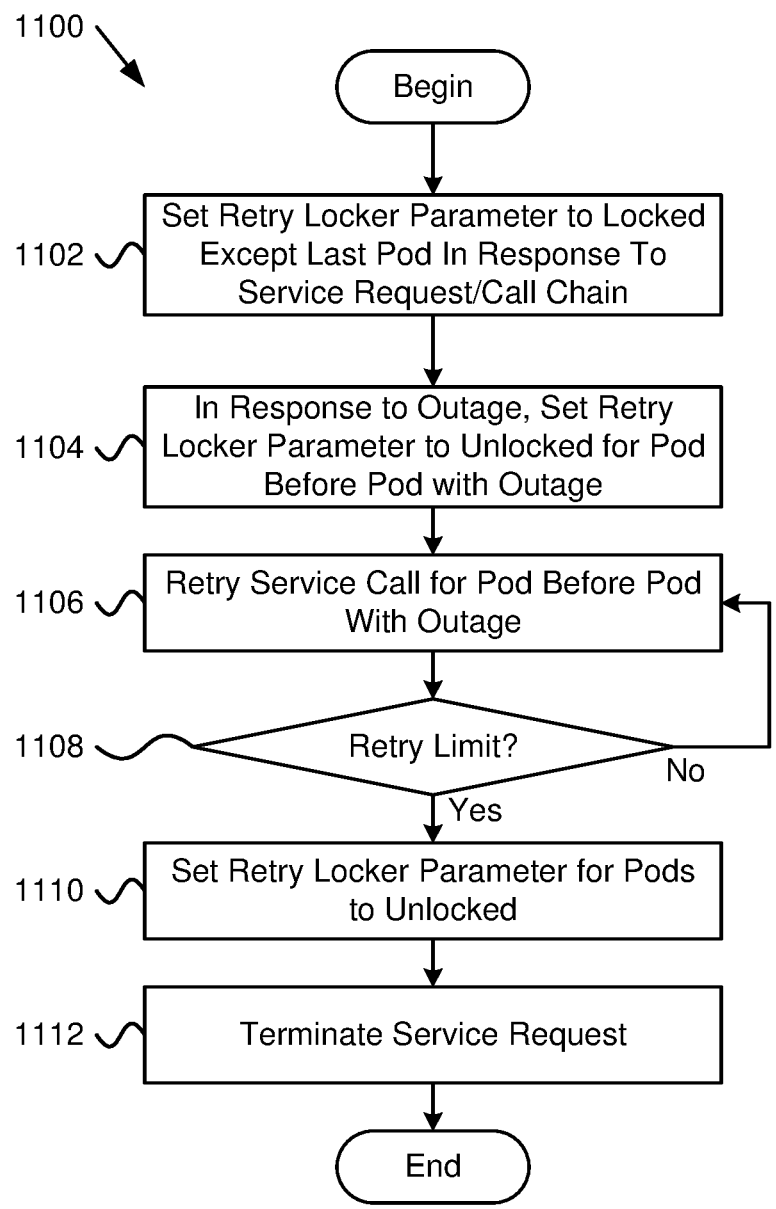
FIG. 11 is a schematic flow chart diagram illustrating a computer-implemented method for gracefully resolving retry storms, in accordance with various embodiments.

FIG. 11 is a schematic flow chart diagram illustrating a computer-implemented method 1100 for gracefully resolving retry storms, in accordance with various embodiments. The computer-implemented method 1100 begins and sets 1102, in response to receiving an incoming service request and establishing a call chain of pods 202 in a service mesh network, a retry locker parameter to a locked state for at least each pod 202 in the call chain except for a last pod 202 in the call chain. The incoming service request requires a subsequent service request and a response from three or more pods in the call chain. The call chain includes the three or more pods in a linear sequence and the retry locker parameter of a pod 202 of the call chain in the locked state prevents the pod 202 from initiating retries of a service request to a subsequent pod 202 of the call chain.

The computer-implemented method 1100 sets 1104, in response to determining that a status of a pod 202 in the call chain is unavailable for responding to a service request from a previous pod 202 in the call chain, the retry locker parameter to an unlocked state for the previous pod 202 just prior to the pod 202 that is unavailable. The unlocked state allows a retry of a service request to the pod that is unavailable. The computer-implemented method 1100 retries 1106 services calls at the previous pod 202 and determines 1108 if a retry counter has reached a retry limit. If the computer-implemented method 1100 determines 1108 that the retry counter has not reached the retry limit, the computer-implemented method 1100 returns and continues to retry 1106 service requests at the previous pod 202. If the computer-implemented method 1100 determines 1108 that the previous pod 202 has reached the retry limit, the computer-implemented method 1100 sets 1110 the retry locker parameter to unlocked for each pod 202 in the call chain and sends 1112 a service termination message to a service requester that sent the incoming service request, and the computer-implemented method 1100 ends. In various embodiments, all or a portion of the computer-implemented method 1100 is implemented with the lock module 250, the single unlock module 252, and/or the unlock module 254.

Figure 12:
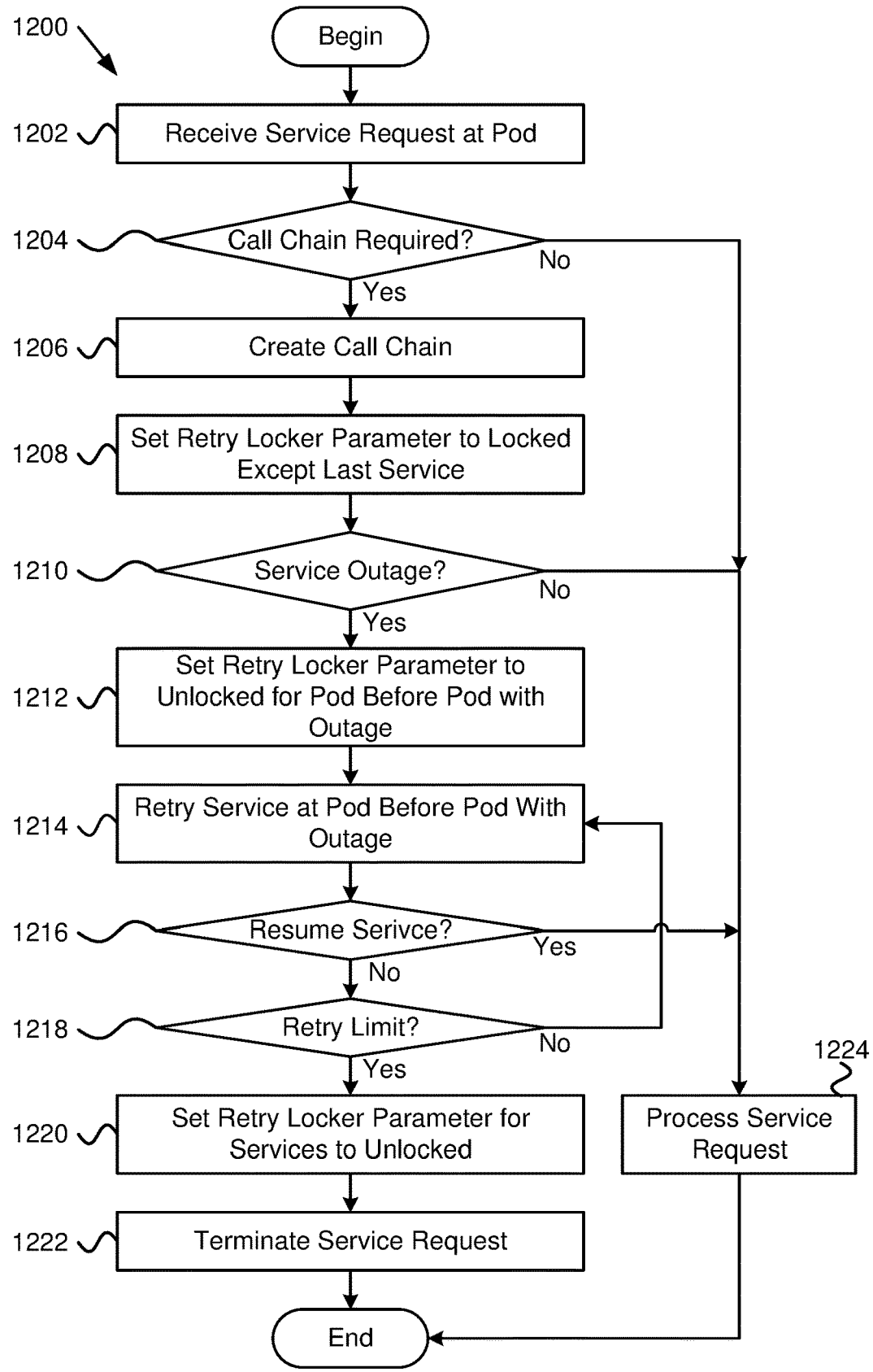
FIG. 12 is a schematic flow chart diagram illustrating another computer-implemented method for gracefully resolving retry storms, in accordance with various embodiments.

FIG. 12 is a schematic flow chart diagram illustrating another computer-implemented method 1200 for gracefully resolving retry storms, in accordance with various embodiments. The computer-implemented method 1200 begins and receives 1202 an incoming service request at a pod of a service mesh network and determines 1204 if a call chain is required. A call chain is required when the service request invokes more than one service. For the computer-implemented method 1200, the call chain includes three or more services in a linear sequence. For example, service A at pod A 202*a* requests a service B from pod B 202*b*, which requests a service C at pod C 202*c*, which requests a service D at pod D 202*d*. If the computer-implemented method 1200 determines 1204 that a call chain is required, the computer-implemented method 1200 creates 1206 a call chain and sets 1208 a retry locker parameter to a locked state for each pod 202 in the call chain except for a last pod 202 in the call chain. The retry locker parameter of a pod 202 of the call chain in the locked state preventing the pod 202 from initiating retries of a service request to a subsequent pod 202 of the call chain.

The computer-implemented method 1200 determines 1210 if a status of a pod 202 in the call chain is unavailable for responding to a service request from a previous pod 202 in the call chain. If the computer-implemented method 1200 determines 1210 that a pod 202 of the call chain is unavailable, the computer-implemented method 1200 sets 1212 the retry locker parameter to an unlocked state for the previous pod 202 just prior to the pod 202 that is unavailable. The unlocked state allows a retry of a service request to the pod 202 that is unavailable. The computer-implemented method 1200 determines 1216 if the pod 202 that is unavailable has resumed providing responses to service requests. If the computer-implemented method 1200 determines 1216 that the pod 202 that is unavailable has not resumed providing responses to service requests, the computer-implemented method 1200 determines 1218 if the previous pod 202 prior to the pod 202 that is unavailable has reached a retry limit. In some examples, the computer-implemented method 1200 monitors a retry counter in the previous pod 202.

If the computer-implemented method 1200 determines 1216 that the previous pod 202 has not reached the retry limit, the computer-implemented method 1200 returns and retries 1214 service requests at the previous pod 202. If the computer-implemented method 1200 determines 1216 that the previous pod 202 has reached the retry limit, the computer-implemented method 1200 sets 1220 the retry locker parameter to unlocked for each pod 202 in the call chain and sends 1222 a service termination message to a service requester that sent the incoming service request, and the computer-implemented method 1100 ends.

If the computer-implemented method 1200 determines 1216 that the that the pod 202 that was unavailable has resumed providing responses to service requests, the computer-implemented method 1200 processes 1224 the service request and the computer-method 1200 ends. If the computer-implemented method 1200 determines 1204 that a call chain is not required, for example if only one service is required to response to a service request, the computer-implemented method 1200 processes 1224 the service request and the computer-implemented method 1200 ends. In various embodiments, all or a portion of the computer-implemented method 1200 is implemented with the lock module 250, the single unlock module 252, the unlock module 254, the resume module 256, and/or the status module 258.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    in response to receiving an incoming service request and establishing a call chain of pods of a service mesh network, setting a retry locker parameter to a locked state for at least each pod in the call chain except for a last pod in the call chain, the incoming service request requiring a subsequent service request and a response from three or more pods in the call chain, the call chain comprising the three or more pods in a linear sequence, the retry locker parameter of a pod of the call chain in the locked state preventing the pod from initiating retries of a service request to a subsequent pod of the call chain;
    in response to determining that a status of a pod in the call chain is unavailable for responding to a service request from a previous pod in the call chain, setting the retry locker parameter to an unlocked state for the previous pod, the unlocked state allowing a retry of a service request to the pod that is unavailable; and
    in response to the previous pod reaching a retry limit, setting the retry locker parameter to unlocked for each pod in the call chain and sending a service termination message to a service requester that sent the incoming service request.

2. The computer-implemented method of claim 1, further comprising, in response to the previous pod receiving a response to a service request prior to reaching the retry limit, setting the retry locker parameter to unlocked for each pod in the call chain and responding to the incoming service request received at a first pod in the call chain.

3. The computer-implemented method of claim 2, wherein in response to the previous pod receiving a response, the pods in the call chain each respond in turn to a received service request.

4. The computer-implemented method of claim 1, wherein each pod comprises an application configured to provide a response to a service request and a mesh network component facilitating communication between the application and other pods of the service mesh network.

5. The computer-implemented method of claim 4, wherein determining that the status of the pod in the call chain is unavailable comprises:
    receiving a status from a mesh network component of the pod that is unavailable indicating that the pod is unavailable; and/or
    determining, by a mesh network component in the previous pod, that the pod that is unavailable has not sent a response prior to a service request timeout.

6. The computer-implemented method of claim 4, further comprising determining a status of the retry locker parameter, a retry counter, and a timeout counter of each pod of the call chain prior to setting the retry locker parameter for each pod of the call chain, wherein the status of the retry locker parameter, the retry counter, and the timeout counter of each pod of the call chain are stored in a metadata store.

7. The computer-implemented method of claim 4, wherein a retry controller communicates with each mesh network component and a retry locker parameter status, a retry status, and a retry timeout status for each pod of the call chain are stored in a common metadata store, wherein the retry controller sets the retry locker parameter for each pod of the call chain.

8. The computer-implemented method of claim 4, wherein each pod of the call chain comprises a retry locker and wherein the mesh network component of each pod of the call chain communicate with each other and a retry locker of a pod sets the retry locker parameter for the pod in response to communications from at least one or more adjacent pods in the call chain.

9. An apparatus comprising:
    a lock module configured to, in response to receiving an incoming service request and establishing a call chain of pods of a service mesh network, set a retry locker parameter to a locked state for at least each pod in the call chain except for a last pod in the call chain, the incoming service request requiring a subsequent service request and a response from three or more pods in the call chain, the call chain comprising the three or more pods in a linear sequence, the retry locker parameter of a pod of the call chain in the locked state preventing the pod from initiating retries of a service request to a subsequent pod of the call chain;
    a single unlock module configured to, in response to determining that a status of a pod in the call chain is unavailable for responding to a service request from a previous pod in the call chain, set the retry locker parameter to an unlocked state for the previous pod, the unlocked state allowing a retry of a service request to the pod that is unavailable; and
    an unlock module configured to, in response to the previous pod reaching a retry limit, set the retry locker parameter to unlocked for each pod in the call chain and send a service termination message to a service requester that sent the incoming service request.

10. The apparatus of claim 9, further comprising a resume module configured to, in response to the previous pod receiving a response to a service request prior to reaching the retry limit, set the retry locker parameter to unlocked for each pod in the call chain and responding to the incoming service request received at a first pod in the call chain.

11. The apparatus of claim 10, wherein in response to a mesh network element of the previous pod receiving a response, the pods in the call chain each respond in turn to a received service request.

12. The apparatus of claim 9, wherein each pod comprises an application configured to provide a response to a service request and a mesh network component of the pod facilitates communication between the application and other mesh network components of the pods of the service mesh network.

13. The apparatus of claim 12, wherein determining that that the status of the pod in the call chain is unavailable comprises:
   receiving a status from the mesh network component of the pod that is unavailable indicating that the pod is unavailable; and/or
   determining, by the mesh network component in the previous pod, that the pod that is unavailable has not sent a response prior to a service request timeout.

14. The apparatus of claim 12, further comprising a status module configured to determine a status of the retry locker parameter, a retry counter, and a timeout counter of each pod of the call chain prior to setting the retry locker parameter for each pod of the call chain, wherein the status of the retry locker parameter, the retry counter, and the timeout counter of each pod of the call chain are stored in a metadata store.

15. The apparatus of claim 12, further comprising a retry controller in communication with a retry locker in each of the pods of the call chain and wherein the lock module, the single unlock module and the unlock module are controlled by the retry controller and the retry locker of each pod of the call chain.

16. The apparatus of claim 12, further comprising a retry locker in each pod of the call chain and wherein the mesh network component of each pod of the call chain communicate with each other and wherein the lock module, the single unlock module and the unlock module are controlled by the retry locker of each pod of the call chain.

17. A computer program product comprising a non-transitory computer readable storage medium storing code, the code being configured to be executable by a processor to perform operations comprising:
   in response to receiving an incoming service request and establishing a call chain of pods of a service mesh network, setting a retry locker parameter to a locked state for at least each pod in the call chain except for a last pod in the call chain, the incoming service request requiring a subsequent service request and a response from three or more pods in the call chain, the call chain comprising the three or more pods in a linear sequence, the retry locker parameter of a pod of the call chain in the locked state preventing the pod from initiating retries of a service request to a subsequent pod of the call chain;
   in response to determining that a status of a pod in the call chain is unavailable for responding to a service request from a previous pod in the call chain, setting the retry locker parameter to an unlocked state for the previous pod, the unlocked state allowing a retry of a service request to the pod that is unavailable; and
   in response to the previous pod reaching a retry limit, setting the retry locker parameter to unlocked for each pod in the call chain and sending a service termination message to a service requester that sent the incoming service request.

18. The computer program product of claim 17, the operations further comprising, in response to the previous pod receiving a response to a service request prior to reaching the retry limit, setting the retry locker parameter to unlocked for each pod in the call chain and responding to the incoming service request received at first pod in the call chain.

19. The computer program product of claim 17, wherein each pod comprises an application configured to provide a response to a service request and a mesh network component facilitating communication between the application and other pods of the service mesh network.

20. The computer program product of claim 19, wherein one of:
   a retry controller communicates with each mesh network component and a retry locker parameter status, a retry status, and a retry timeout status for each pod of the call chain is stored in a common metadata store, wherein the retry controller sets the retry locker parameter for each pod of the call chain; and
   the mesh network components of each pod of the call chain communicate with each other and a retry locker of a pod sets the retry locker parameter for the pod in response to communications from at least one or more adjacent pods in the call chain.

* * * * *